Figure 1:
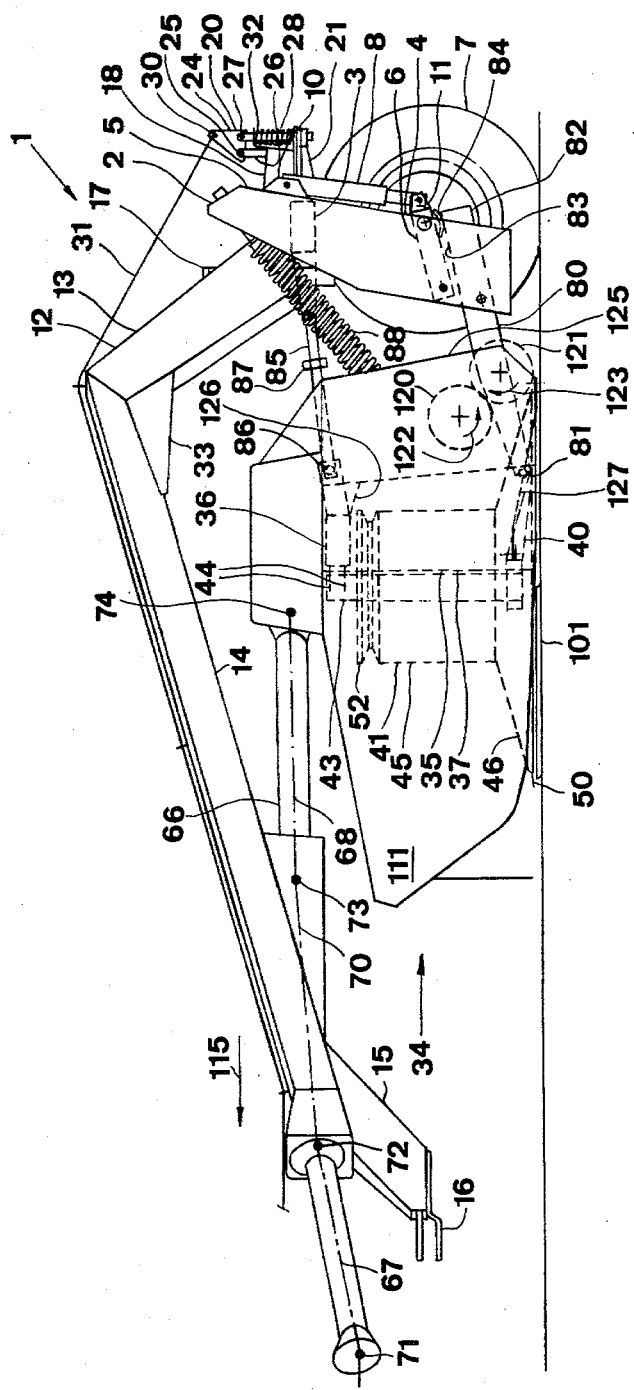

United States Patent [19]

Meek et al.

[11] 4,187,664
[45] Feb. 12, 1980

[54] AGRICULTURAL MACHINE STRUCTURE

[75] Inventors: Nigel W. Meek; Jeffrey S. Ramsay, both of Aylesbury, England

[73] Assignee: Sperry Rand Corporation, New Holland, Pa.

[21] Appl. No.: 890,357

[22] Filed: Mar. 27, 1978

[30] Foreign Application Priority Data

Apr. 5, 1977 [GB] United Kingdom ............... 14244/77

[51] Int. Cl.$^2$ ............................................. A01D 49/00
[52] U.S. Cl. ....................................... 56/13.6; 56/192; 56/228; 56/DIG. 1
[58] Field of Search ................ 56/208, 218, 228, 15.8, 56/15.9, DIG. 1, 13.6, 192

[56] References Cited

U.S. PATENT DOCUMENTS

| 3,599,411 | 8/1971 | Scarnato et al. | 56/228 |
|---|---|---|---|
| 3,751,889 | 8/1973 | Overesch | 56/13.6 |
| 3,783,594 | 1/1974 | Watt et al. | 56/15.8 |
| 3,832,837 | 9/1974 | Burkhart et al. | 56/218 |
| 3,868,811 | 3/1975 | Cicci et al. | 56/1 |
| 3,959,957 | 6/1976 | Halls | 56/208 |
| 3,979,889 | 9/1976 | Vansteelant | 56/192 |

FOREIGN PATENT DOCUMENTS

| 1582367 | 5/1970 | Fed. Rep. of Germany | 56/192 |
|---|---|---|---|
| 1936054 | 1/1971 | Fed. Rep. of Germany | 56/192 |
| 2517816 | 10/1975 | Fed. Rep. of Germany | 56/13.6 |
| 1479813 | 3/1967 | France | 56/192 |

Primary Examiner—Jay N. Eskovitz
Attorney, Agent, or Firm—John B. Mitchell; Frank A. Seemar; Ralph D'Alessandro

[57] ABSTRACT

The present invention relates to a harvesting machine such as a mower-conditioner and comprises a header with a subframe, the subframe comprising a transverse upperbeam, opposed downwardly-extending legs connected thereto, and a lower transverse beam interconnecting and extending between the legs; the upper and lower beams and the legs together forming a rigid, generally rectangular structure. The header further also comprises at least one rotatable cutter unit having a mounting shaft detachably mounted between the upper and lower beams at a location inbetween the legs.

8 Claims, 10 Drawing Figures

AGRICULTURAL MACHINE STRUCTURE

BACKGROUND OF THE INVENTION

1. Field of the Invention

The present invention relates generally to crop harvesting machines particularly, although not exclusively, mower conditioners in connection with which the invention, in the main, will be discussed.

In this specification "right hand", "left hand", "forward" and "rearward" references are determined by standing at the rear of the machines and facing the direction of forward travel.

2. Description of the Prior Art

Prior art crop harvesting machines such as mower-conditioners, windrowers, swathers and the like, incorporate assemblies for suspending the header of the machine from the machine frame. The suspension assemblies commonly include a four link system comprising pairs of upper and lower links. (e.g. U.S. Pat. No. 3,751,889) These links pivotally interconnect and extend between the header and the frame. Springs usually extend between the machine frame and either the lower links or some lower part of the header itself for providing floatation of the header from the frame. Whilst these prior art machines are generally satisfactory for their intended purposes, improvement in header suspension and floatation is desirable to enhance the overall performance and versatility of the machine under varying field conditions, such as uneven field contours or terrain. A four-link suspension system sometimes restricts lateral floatation of the header responsive to the uneven terrain or if special arrangements are made to allow the desirable lateral floatation, the construction is rather complicated and expensive. Also, when it is necessary to adjust the header tilt, two links must be adjusted by a similar amount. This is often difficult and time-consuming.

It is recognised that a pull-type harvesting machine must be offset relative to the towing tractor during operation to prevent the tractor trampling the crop before it is harvested by the machine. However, for transportation on public roads, for example, the harvester should be positioned in line with the tractor and the overall width of the tractor with the harvester attached therebehind must not exceed 2.5 meters to comply with various traffic regulations. Most prior art harvesters have an angularly adjustable drawbar pivotally mounted to one side of the harvester frame and extending along one side of the header (e.g. U.S. Pat. No. 3,599,411) Power is transmitted to the harvester via a power line which is mounted on, and generally parallel to, the drawbar and which is connected to a gearbox which itself is mounted on the frame adjacent the drawbar pivot shaft and adjacent the side of the header. Because of the side-mounted gearbox and drawbar, the harvester is wider in the transport position than the harvesting width (e.g. the cutting width in case of a mower or mower conditioner). In other words, the maximum harvesting width of such machines is substantially less than the overall width.

In an attempt to overcome this disadvantage and maximize the operating width, other prior art mowers and mower conditioners have been provided with an arched tongue or drawbar pivotally connected to the machine at a location rearwardly of the header or harvesting apparatus and capable of being swung thereover. (e.g. U.S. Pat. Nos. 3,832,837 and 3,868,811) In such machines the effective harvesting width practically equals the total machine width when in the transport position. Known mower-conditioners equipped with an arched "over-the-header" tongue have a reciprocating sickle-type cutter bar and a reel structure positioned thereabove for conveying cut crop rearwardly over the cutter bar to the conditioner means. The arched tongue should be so dimensioned that it can pivot with clearance over the aforementioned reel. A substantial portion of this clearance is intended for enabling the header to be raised to its transport position at a substantial height above the ground, without the reel interfering with the arched tongue. All this dictates that the arched drawbar or tongue is a heavy structure having a heavily arched portion extending a substantial height above the ground. Due to this raised, arched drawbar, it is practically impossible to mount a mechanical power transmission on the drawbar. Instead, an expensive hydraulic transmission has had to be employed.

The header suspension of known mower-conditioners, equipped with reciprocating sickle-type cutterbar is arranged so that the header can pivot around a rearwardly located, horizontal, transverse pivot shaft. Hence such a cutterbar positioned at the forward end of the header does not remain horizontal either during floatation over ground irregularities or when the header is raised to a transport position. Instead, the cutterbar is inclined upwardly in a forward direction when the header is in a raised position. Recently, the conventional reciprocating sickle-type cutterbars of several types of harvesters have been replaced by rotary type cutters because, in general, such cutters have a much better cutting performance and a much higher operating speed.

With a rotary type cutter it is, however, essential that it remains generally horizontal during operation, irrespective of the floatation of the header in response to the rise and fall of the ground level because otherwise an uneven cut is obtained and contact with the ground may result in broken cutter blades which can be impelled by the cutters and constitute a hazard to the machine operator and others. The mower units must also preferably be held generally parallel to the ground when the header is lifted from the operative position. This means that the header suspension of a conventional harvester with a conventional reciprocating cutterbar cannot be used with a harvester employing a rotary type cutter.

There are two known types of rotary cutters, namely the so-called "disc" type and the so-called "drum" type. When a disc-type cutter bar is installed, a reel positioned thereabove is still desirable and in some structures even necessary. Hence the aforementioned disadvantage of an arched "over-the-header" drawbar being required for a pull type harvester with a maximum allowable cutting width is equally inherent in this type of harvester.

Drum-type cutters have been used in the main independent mowers although some attempts have been made to combine such mowers with a crop conditioner. (e.g. U.S. Pat. No. 3,751,889) However, such mower-conditioners never have been equipped with an "over-the-header" tongue or drawbar.

Most drum-type mowers have cutter drums mounted on spindles depending from a cantilevered transverse beam. (e.g. U.S. Pat. No. 3,751,889) The drive for the mower units is often installed inside the beam and may comprise conical gears. This arrangement is disadvantageous as the spindles, the beam and the drive gears often are subjected to considerable loading, resulting in heavy wear in the drive and sometimes in distortion of the spindles and the transverse beam. Furthermore, gear drives are often noisy and expensive and manufacturing tolerances are tight. A lubrication system is necessary and service is difficult and frequent. Therefore, to overcome all these problems it has already been suggested to replace the gear drive by a belt drive and to support the mower units between upper and lower transverse beams. The spindles may extend through the upper beam and have drive pulleys at their upper ends above this upper beam. However, it would be better to provide the belt drive between the beams, preferably adjacent the underside of the upper beam. Unless special precautions are taken this drive arrangement would give rise to difficulties when a drive belt has to be replaced.

SUMMARY OF THE INVENTION

According to the present invention a harvesting machine with a header is provided, the header comprising a subframe having a transverse upper beam, opposed downwardly-extending legs connected thereto, and a lower transverse beam interconnecting and extending between the legs; the upper and lower beams and the legs together forming a rigid, generally rectangular structure and the header further also comprising at least one rotatable cutter unit having a mounting shaft detachably mounted between the upper and lower beams.

Preferably, at least one pair of contra-rotatable cutter units are provided with the mounting shaft of each detachably mounted between the upper and lower beam at locations between the legs. To this end, each mounting shaft may be carried by brackets detachably connected, respectively, to the upper and lower beams. A gearbox may be mounted adjacent one end of the upper beam, the gearbox comprising a downwardly-extending output shaft supporting a drive pulley at a level adjacent but below the underside of the upper beam. In this case, the cutter units comprise pulleys at their upper ends aligned with the drive pulley. A single hexagonal drive belt is arranged around the drive pulley on the gearbox, the pulleys on the cutter units and idler pulleys.

The cutter units and the drive therefor are contained entirely within the rectangular sub-frame so that good cutter stability is provided. The rectangular sub-frame also provides a good base for mounting the header on a main frame. To replace a belt, the upper brackets are disconnected from the upper beam, thereby allowing the new belt easily to be installed. The hexagonal belt drive system gives a smooth and quiet drive which is also of simple construction, easy in maintenance and of low cost. The gearbox is equally of a very simple design.

The header may be suspended from the main frame by suspension means, the main frame being of inverted general U-shape and comprising an upper transverse beam and two depending legs attached to respective ends of said upper transverse beam, the lower ends of the legs having respective rearwardly-extending arms pivotally attached thereto and carrying respective ground-engaging wheels. The header suspension means may comprise two lower side links pivotally connected at one end to the respective legs of the header subframe and pivotally connected to the respective legs of the main frame below the arms of the latter, an upper central link pivotally attached to and interconnecting to upper transverse beams of the header subframe and the main frame, and resilient means disposed between the lower ends of the header subframe legs and upper mounting points of the main frame. The pivotal connections between the side links and the header subframe and at both ends of the central link preferably are through ball joints which permit lateral floatation of the header as well as vertical floatation and the central link may be adjustable in length to vary the inclination and thus the normal cutting height of the or each cutter unit.

The arms of the main frame may engage the side links of the suspension means rearwardly of the respective pivot points of the links and arms, hydraulic actuators being provided between the rear ends of the arms and upper mounting points on the main frame and operable to raise the header from an operative position to a transport position and vice versa.

In a preferred embodiment, the hydraulic actuators are retracted to lower the header from the transport to the operative and the header drops until the wheel-supporting arms bottom on the side links of the suspension means. The side links are free to pivot on the main frame to allow the header to float and follow the contour of the ground. Raising the header to the transport position is accomplished by extending the actuators which rotate the wheel-supporting arms about their main frame pivots, thereby raising the main frame relative to the ground. At some point during this movement the wheel-supporting arms will contact the side links of the suspension means and rotate these links about their pivots to raise the header relative to the frame. The lift mechanism not only raises the header relative to the ground, but also raises to a lesser extent the main frame which supports windrow shields for example. This additional windrow shield ground clearance is desirable when leaving a cut field to clear windrows, and also to clear other ground obstructions whilst transporting the machine.

The machine may be of the pull type and in this case an arched drawbar is provided with the forward end thereof adapted for hitching to a vehicle to tow the machine and for connection to a power take-off shaft of the towing vehicle, the rearward end of the drawbar being pivotally attached to the upper transverse beam of the main frame at a point offset from the centre of that beam.

Since the header lifting system raises the header relative to the main frame (and hence also relative to the drawbar) and simultaneously raises the frame relative to the ground, then a given header ground clearance is obtained with a smaller header lift relative to the frame. This allows the use of a drawbar with a less severe curvature than in known machines. Furthermore, the provision of drum cutter units allows the normal reel structure to be dispensed with because the drums take over the crop conveying function. The height of the cutter drums is substantially smaller than the height of a conventional reel, which also helps reduce the curvature of the drawbar. Such a small curvature drawbar enables a power transmission line to be supported therein without there being an unduly large angular offset between sections of the transmission.

IN THE DRAWINGS

Figure 2:
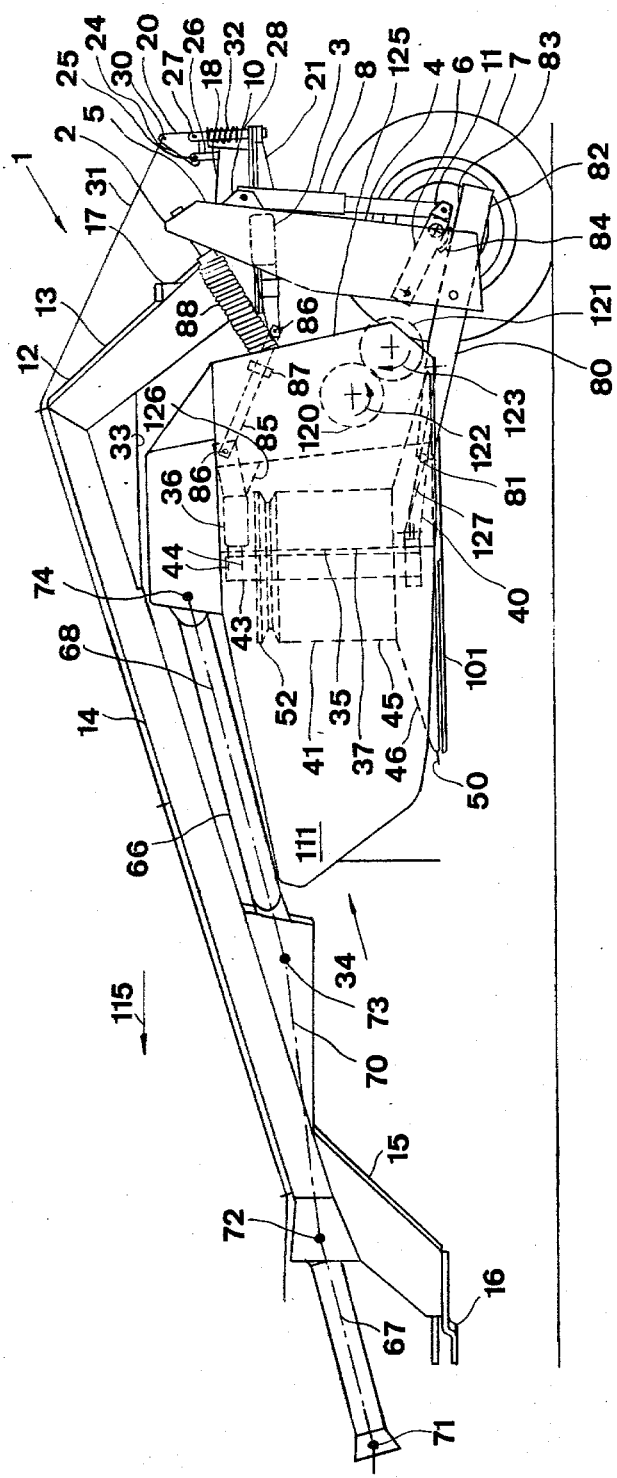
Figure 3:
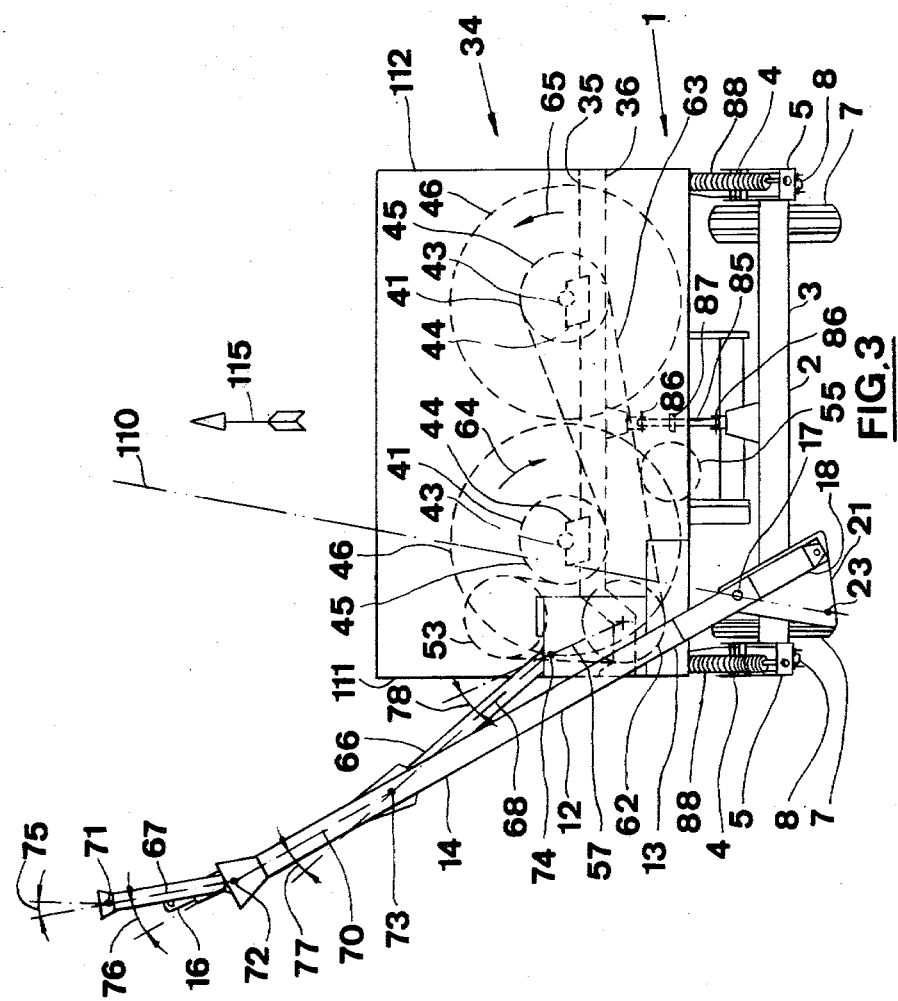
Figure 4:
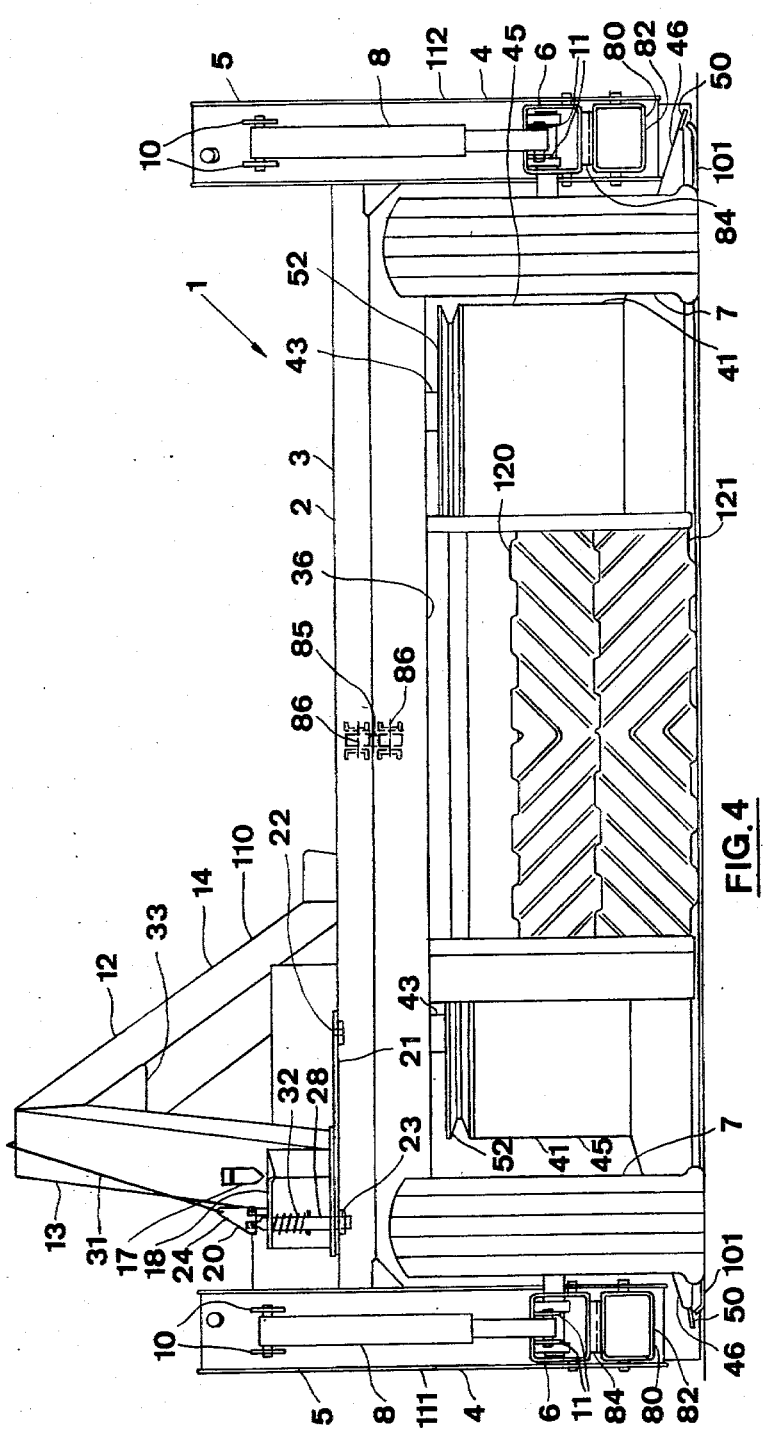
Figure 5:
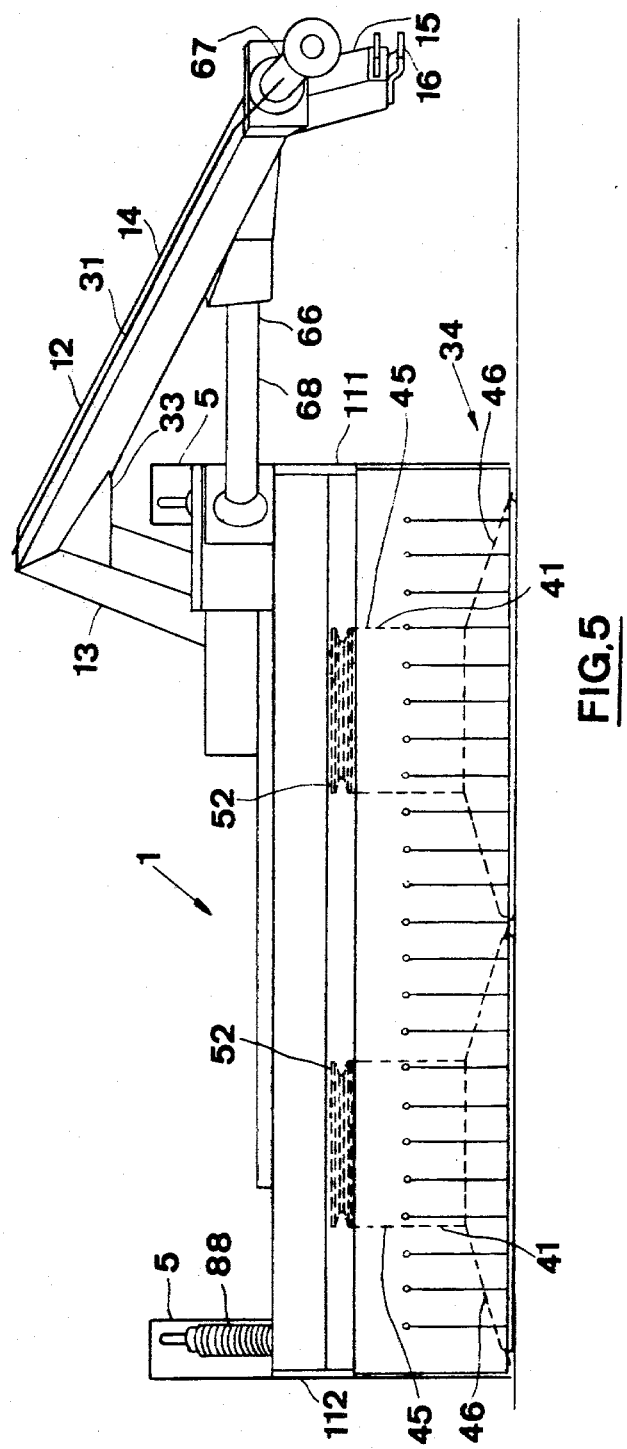
Figure 6:
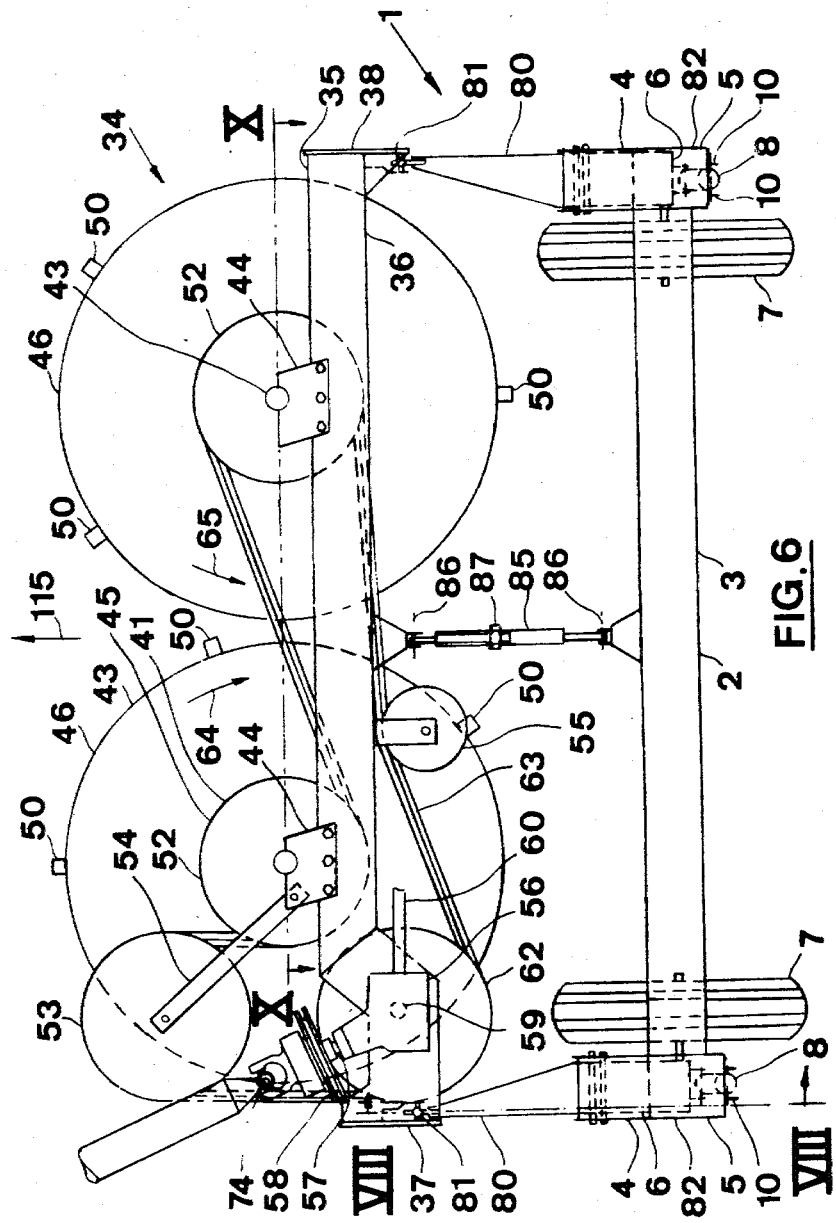
Figure 7:
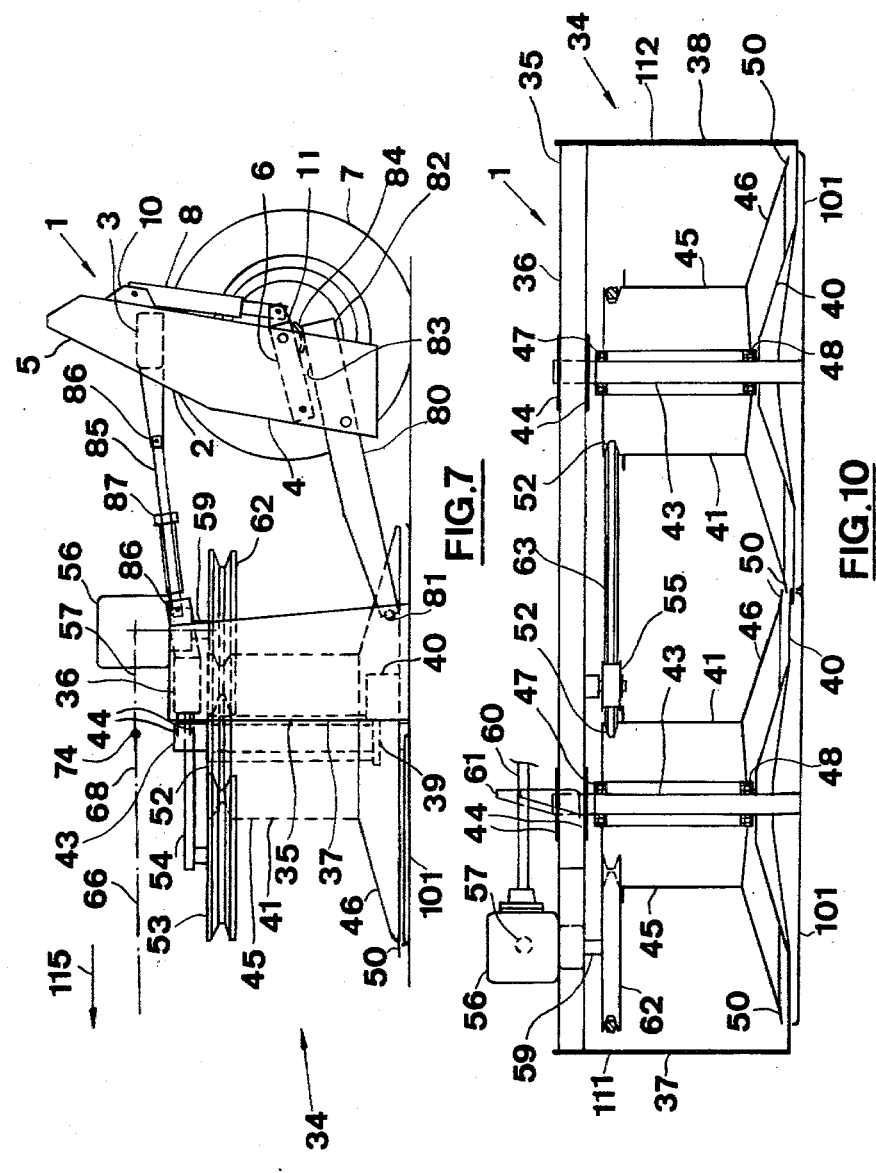
Figure 8:
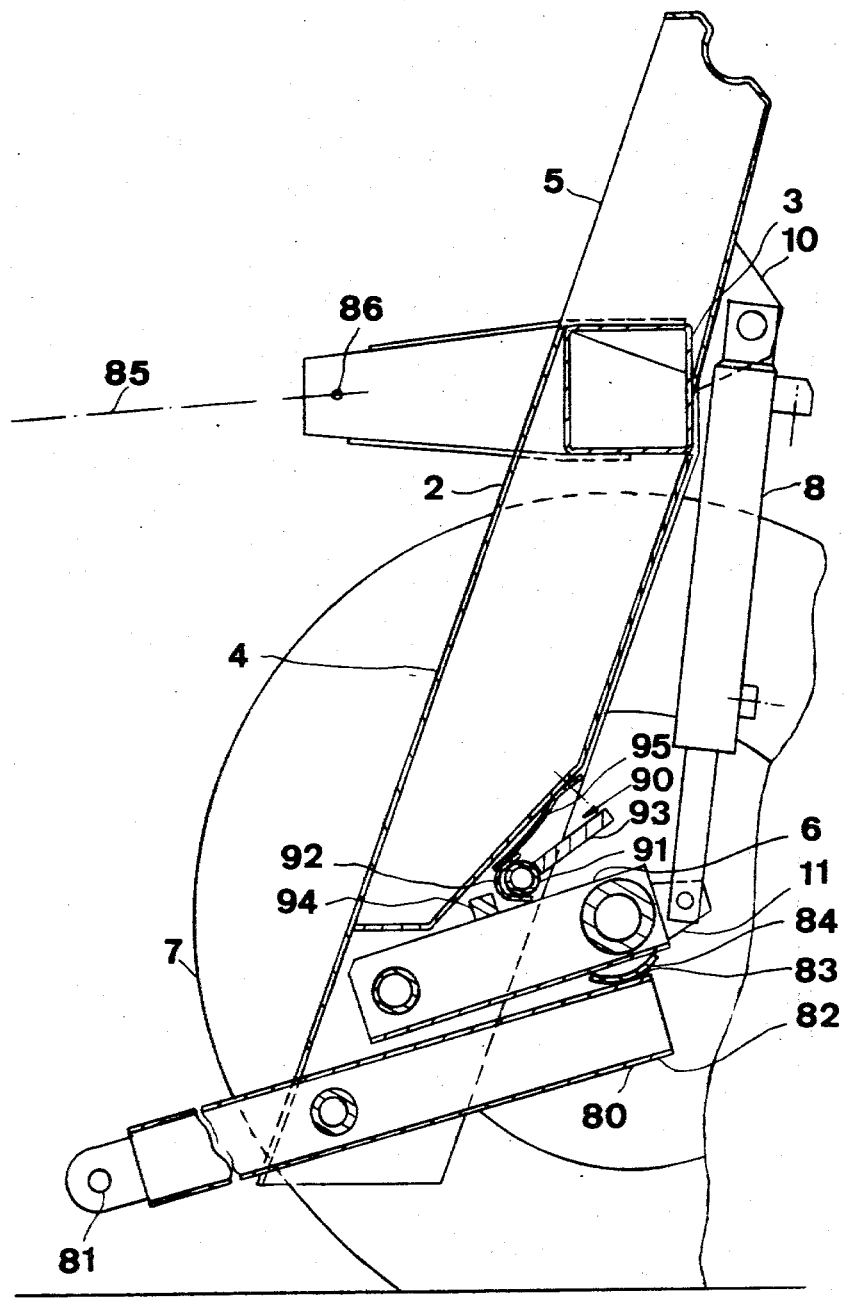
Figure 9:
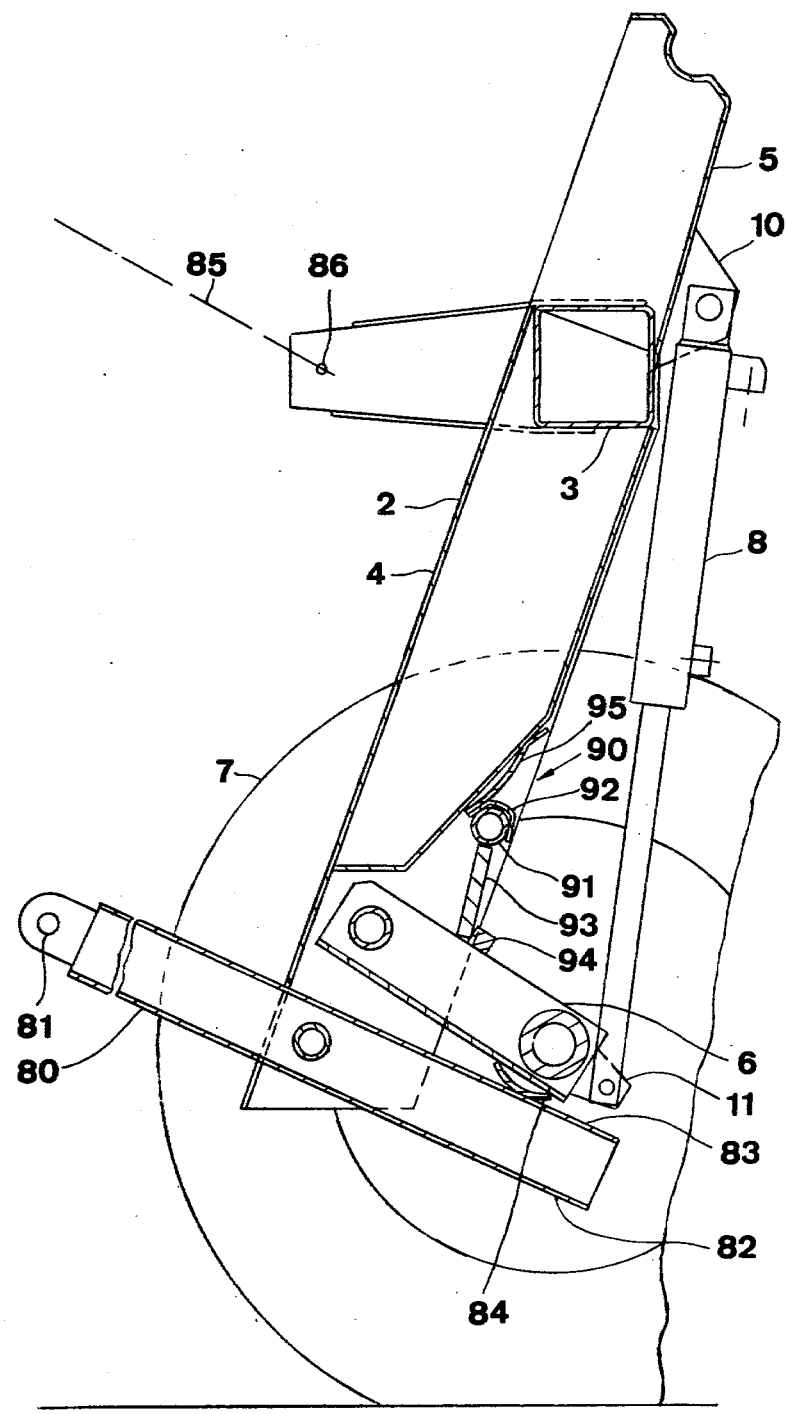

A harvesting machine, in the form of a mower conditioner, embodying the present invention will now be described in greater detail, by way of example, with reference to the accompanying drawings, in which:

FIG. 1 is a side elevational view of the mower-conditioner,

FIG. 2 is a view similar to FIG. 1 but with certain components in another position, FIG. 3 is a plan view, to a smaller scale, of FIG. 1, FIG. 4 is a view from the right-hand side of FIG. 1, with certain components in another position, FIG. 5 is a view from the left-hand side of FIG. 1, FIG. 6 is a view similar to FIG. 3 but on a larger scale and with certain components removed for clarity, FIG. 7 is a side view from the left-hand side of FIG. 6, FIG. 8 is a partial sectional view taken along the line VIII—VIII of FIG. 6, FIG. 9 is a view similar to FIG. 8 but showing the structure in another position, and FIG. 10 is a schematic sectional view taken along the line X—X of FIG. 6, and wherein certain components have not been shown for clarity.

PREFERRED EMBODIMENT

The mower conditioner is generally indicated at 1 and comprises a mobile main frame 2 of inverted general U-shape and having a main transverse beam 3 and depending legs 4 at opposed ends thereof. The legs 4 have extensions 5 which project above the transverse beam 3 and the legs pivotally support adjacent their lower ends respective rearwardly-extending wheel arms 6, each of which in turn rotatably supports at its rearward end a ground-engaging wheel 7. A pair of hydraulic cylinders 8 interconnect, and are pivotally attached to, respective supports 10 on the extensions 5 and supports 11 at the rearmost ends of the wheel arms 6. The hydraulic cylinders are of the "master-and-slave" type for giving equal effect at each side of the machine.

The upper main beam 3 pivotally supports intermediate its ends, but offset from the centre, the rear end of a forwardly projecting arched drawbar 12. The arched drawbar 12 has a steeply rearwardly and downwardly inclined rear section 13 connected to a longer, forwardly and downwardly inclined section 14. The inclination to the horizontal of the section 14 is less than that of the section 13. The section 14 is connected at its forward end to a steeply forwardly and downwardly inclined extension 15 which in turn supports at its forward end a hitch 16 for coupling the machine to a pulling tractor or the like (not shown). The rear section 13 comprises at its rear end a vertical pivot 17 for pivotal connection to the upper beam 3 and a further rearwardly and generally horizontally projecting extension 18 for supporting at the rear end thereof a latch 20. The main beam 3 comprises a generally horizontally and rearwardly-projecting quadrant plate 21 with two spaced apertures 22, 23. The extension 18 is arranged to slide over the quadrant plate 21 during pivotal movement of the draw bar 12.

The latch 20 comprises a triangular rocking member 24, pivotally mounted at one corner 25 via a support 26 on the extension 18; pivotally connected at another corner 27 to a latch pin 28 and connected at the third corner 30 to a control rope 31. Spring means 32 are arranged to urge the latch pin 20 to a latching position in either the aperture 22 or 23. The control rope 31 is provided between the latch 20 and a location adjacent the operator's seat on the tractor (not shown). A reinforcing fillet 33 is secured to the arched draw bar at the junction between the sections 13 and 14.

The header is generally indicated by numeral 34 and will now be described in further detail. The header 34 comprises a subframe 35 which is best shown in FIG. 10. This sub-frame is generally rectangular in shape and comprises a transverse upper main beam 36 with depending legs 37, 38, at the opposed ends thereof. A lower, shaped transverse beam 40 interconnects and extends between the lower ends of the depending legs 37, 38. Drum type cutter units are generally indicated at 41 and are rotatably mounted on the rectangular subframe 35 between the upper and lower beams 36 and 40. The lower beam 40 has, to this end, a pair of forwardly projecting supports 39 (FIG. 7) which provide journals for the lower ends of spindles 43 of the mower units 41. The spindles 43 are journalled at their upper ends in supports 44 which can be bolted or otherwise releasably secured to the forward edge of the upper beam 36.

The cutter units 41 comprise drums 45 supporting frustoconical flanges 46 at their lower ends and rotatably mounted on the spindles 43 via upper and lower bearings 47 and 48. The relatively widely spaced upper and lower bearings 47 and 48 give good stability to the cutter units 41. The flanges 46 support at their lower sides pivotable cutter blades 50 in a manner well known in the art. The cutter paths of the two cutter units 41 overlap each other at the central area and in order to avoid collision of blades 50 when the machine is operating, these paths are slightly staggered in height.

The drums 45 further comprise V-pulleys 52 at their top ends. A further pulley 53 is mounted on the subframe 35 via a support 54 and a tension pulley 55 is mounted on the rear side of the upper beam 36 and at a location between the cutter units 41.

The rectangular sub-frame 35 supports a gearbox 56 at a location forwardly of, and adjacent, the pivot shaft 17 of the arched drawbar 12. The gearbox 56 has a forwardly extending input shaft 57 with a safety clutch 58 mounted thereon, and a pair of output shafts 59, 60. The output shaft 59 projects downwardly and extends to a location below the upper beam 36. The output shaft 60 extends generally horizontally, in a transverse direction, and is supported in a bracket 61 (FIG. 10) on the sub-frame 35. The horizontal shaft 60 drives crop conditioner means (to be referred to hereinafter) through a conventional drive transmission which is not shown in order to simplify the drawings. The output shaft 59 supports a drive pulley 62 at its lower end, which pulley is co-planar with the pulleys 52 of the cutter units 41. A hexagonal belt 63 extends around the pulleys 62, 52, 53 and 55 in a manner shown most clearly in FIG. 6 so as to rotate the cutter units in opposite directions 64, 65 as indicated.

The input shaft 57 of the gearbox 56 with the safety clutch 58 mounted thereon is coupled to an input power line generally indicated at 66 and comprising telescopic shafts 67, 68, an intermediate shaft 70 and universal joints 71, 72, 73 and 74 associated therewith. The power line 66 is connectible to a tractor PTO shaft (not shown). The intermediate shaft 70 is rotatably supported on the drawbar 12 and extends from a location above the foremost drawbar section 15 to a location below the forward end of the elongated drawbar section 14. The drive line is arranged in such a manner so that when the header is in its operative position, alignment of the various sections is very good. In other words, when the header is in the operative position, then the power line extends generally horizontally from the tractor PTO to the gearbox 56 and the various sections 67, 68, 70, define only small angles 75, 76, 77 and 78 at the junctions.

The suspension of the header 34 on the mobile frame 2 will now be described in greater detail. The downwardly-extending legs 4 of the main frame 2 pivotally support at their lower ends, and below the pivotal mountings of the wheel arms 6, a pair of header mounting links 80. These links 80 are pivotally coupled at their forward ends to the lower ends of the depending legs 37, 38 of the header subframe 35 via ball joints 81 and have rearwardly-projecting extensions 82 extending below the wheel arms 6 and having contact surfaces 83 for contacting hardened arcuate members 84 on the wheel arms 6.

A single central link 85 interconnects and extends between the upper beam 3 of the main frame 2 and the upper beam 36 of the header sub-frame 35. The link 85 has a ball joint 86 at each end for attachment to the respective beams 3 and 36 and is adjustable in length by means of a turnbuckle 87. Springs 88 interconnect and extend between the lower ends of the legs 37, 38 of the header sub-frame 35 and the upper ends of the extensions 5 on the U-frame 2 for resiliently supporting the header 34 in its operative position.

A transport latch system 90 (FIGS. 8 and 9) is pivotally mounted on the main frame and comprises pivots 91 with cups 92 and latch members 93. The latch members 93 can lock behind stops 94 on the respective wheel arms 6. Latch retaining spring means 95, mounted on the U-frame 2, cooperates with the cam means 92 for holding the latch system 90 in its operative or inoperative position.

Stationary ground-engaging skids 101 are secured to the lower ends of the spindles 43 at a location below the cutter units 41 and the transverse beam 40 and have forward edges generally corresponding to, and located at a small clearance below, the associated forward edge of the cutter units 41. The skids 101 are coupled to each other at their adjacent sides and rearwardly of the foremost sections so as to form a rigid transverse structure extending substantially over the total width of the header. The cutter blades 50 project beyond the forward edges of the skids 101. Preferably, the skids 101 are made adjustable in height so that the cutting height, and hence the stubble length, can be varied. The adjusting means may be conventional and are therefore not shown in any detail.

A pair of conditioner rolls 120, 121 are mounted on the sub-frame 35 at a location rearwardly of the cutter units 41 and more especially rearwardly of the crop discharge gap between the cutter drums 45 and generally above the rear of the flanges 46. The length of the conditioner rolls 120, 121 generally corresponds to the width of the crop discharge gap.

The mower conditioner means 120, 121 are mounted in a further sub-frame 125 which itself is mounted on the rectangular sub-frame 35, being connected at its top end to the upper transverse beam 36 by brackets 126 and at its bottom end to the lower transverse beam 40 by brackets 127. The lower brackets 127 project between the cutter flanges 46 and the skids 101. Thus, rather than being cantilevered, as in most known machines, the conditioner means are rigidly mounted on a rigid, ground-supported structure both at the top and bottom ends.

Windrow baffles or shields (not shown) may be mounted on the main frame 2 for deflecting and depositing crop discharged from the conditioner means into a clean windrow onto the ground ready for drying.

OPERATION

In operation, the machine 1 is coupled to a pulling tractor (not shown) and the power line 66 coupled to the PTO shaft in a conventional manner. The hydraulic lifting cylinders 8 are coupled to the hydraulic power system of the tractor. When the machine is in its transport position, e.g. for movement on public roads, then the drawbar 12 is positioned over the header 34 as by the broken line 110 in FIG. 3. In this position, the latch pin 28 is inserted in the latch hole 23 of the quadrant plate 21. The overall width of the machine is, in this position, defined by sidewalls 111, 112 and does not exceed the maximum allowable width of 2.5 meters as is prescribed by several road regulations. This transport width is almost identical to the total cutting width.

In the transport position, the header 34 is in its raised position which means the hydraulic cylinders 8 are fully extended, thereby holding the wheel arms 6 in their lowermost positions. This also means that the frame 2 is in a raised position relative to the wheels 7 and to the ground. At the same time, the wheel arms 6, and more especially the contact surfaces 84 thereof, hold the extensions 82 of the lower header suspension links 80 in a lowered position. Hence the forward ends of these links are raised relative to the frame 2 holding the header 34 in a raised position at a small clearance below the drawbar 12. The latch member 93 is in its lowermost latching position and hence in contact with the stops 94 on the wheel arms 6 so failure of the hydraulic lifting system would not result in the header abruptly falling to the ground surface.

For operation in the field, the latch pin 28 is released from the latching hole 23 by pulling on the control rope 31. The tractor is then driven forwardly and, as a result of the pivot 17 being offset from the centre of the main frame 2, the drawbar 12 is caused to pivot to its offset position relative to the mobile frame 2 and the header 34 and as is shown in full lines in FIG. 3. The latch spring 32 causes the latch pin 28 to engage the latching hole 22 of the quadrant plate 21. In this position of the drawbar 12 the header 34 is offset relative to the tractor when moving in the working direction 115, whereby the tractor is clear of the crop being harvested by the machine.

Next the transport latches 90 are pivoted to their raised, unlatched positions and are held therein by the latch retaining springs 95. When hydraulic fluid is allowed to drain from the hydraulic lifting cylinders 8, the header 34 is lowered relative to the mobile frame 2 on the one hand, and the main frame 2, together with the header 34 are lowered relative to the ground, on the other hand. Thus, the header 34 contacts the ground through the skids 101. The clearance between the drawbar 12 and the header 34, when the latter is in its operative position, is substantially smaller than the ground clearance of the header 34 when in its transport position. In other words, the movement of the header 34 relative to the drawbar 12, when being moved from the operative position to the transport position and vice versa, is rather small. This results in a good alignment of the power line 66 when the header is in its operative position, and a still acceptable alignment when the header is in the transport position.

The compensation spring means 88 are adjusted so as to reduce the ground pressure of the skids so that the header 34 will easily float over ground undulations during operation. The spring tension is also easily adjusted for varying the ground pressure of the skids in accordance with the ground conditions. The links 80 and 85 forming a parallelogram linkage when seen in side view, together with the springs 88, cause the header 34 to remain generally parallel to the ground during any raising or lowering to accommodate ground undulations, and during lifting to the transport position. In addition, the ball joints 81 on the lower links 80 and the ball joints 86 on the single upper link 85 enable a limited transverse floatation of the header 34 over ground irregularities generally transverse of the machine.

In operation, the cutter units 41 are driven in the opposite direction 64, 65 and the conditioner rolls 120, 121 are driven in the direction 122, 123. The crop is cut by the cutter blades 50 and conveyed rearwardly through the opening between the adjacent drums 45 and towards the conditioning rolls 120, 121 positioned therebehind. The cut crop is then fed between the rolls 120, 121 for conditioning in known manner. The conditioner rolls 120, 121 finally discharge the conditioned crop in a rearward direction in a fluffly windrow on the ground ready for drying.

As will be understood from the foregoing description, a mower conditioner, having a very simple construction and drive means, has been provided. The header structure has a very rigid rectangular sub-frame which is further reinforced by the cutter spindles being attached securely thereto between the upper and lower beams rather than being cantilevered as in known machines. The mower units are firmly supported at their top and bottom ends, whereby the load on the frame, the spindles and the drive is reduced substantially. The belt drive is within the rectangular framework to help further reducing bending movements on the spindles. Nevertheless, belt replacement can be effected very quickly and easily. Indeed, a new belt can be placed, from below, around the pulleys 62, 53 without having to disassemble any components. Only for mounting the belt around the right-hand pulley 52 it is necessary to unbolt the associated support 44 and give it a half turn so that the belt can be introduced between the support and the upper beam 36. Whilst doing this, the associated mower unit 41 remains in place as a result of the spindle being journalled in the lower transverse beam. After insertion of the belt, the support 44 is easily re-secured to the upper beam 36. Assembly of the mower is also simplified, as the cutter units can be pre-assembled on the spindles then mounted in the rigid rectangular sub-frame.

A simple gearbox design is also possible, allowing an angled input shaft for improved PTO alignment and the driveline between the two does not contain any sharp angles when the header is in the operative position and is adequately supported on the drawbar for maximum support and safety protection even though the drawbar is of the arched type. In other words, a good PTO alignment which otherwise is diffcult to obtain with an offset machine or with an "over-the-header" tongue, is obtained. This results in a longer life of the driveline. Furthermore, expensive hydraulic drive means for a harvester comprising an "over-the-header" drawbar are no longer needed.

The drive to the cutter drums via a single hexagonal belt drive system gives a smooth drive, a simple construction, easy maintenance, a low cost and is quiet in operation. Each driven pulley is an integral part of the drum construction. The entire driveline of the tractor PTO to the cutter units and the conditioner rolls comprises only one simple gearbox. This drive line is further safeguarded from damage due to overload by the safety clutch 58. The manufacturing tolerances are no longer as tight as are necessary on gear-driven mowers. Less lubrication is necessary and service is easier and less frequently required.

The rectangular sub-frame of the header gives good support for the compensation springs and the suspension system. The compensation springs have been so positioned that, as the header rises and falls to accommodate undulating ground conditions, the weight on the skids remains almost constant. Also good guards for all moving parts can easily be mounted on the sub-frame. The header suspension with its three links is very simple and cheap in construction and facilitates adjustment of the fore-and-aft header tilt, and hence the inclination of the cutter paths relative to the ground. The linkage system is such that the header, and thus also the cutter units, remain generally parallel to the ground during up-and-down movement due to ground irregularities. Nevertheless, lateral floatation has become possible to a limited extent so that the overall suspension of the header has improved. As already mentioned, the ground pressure of the supporting skids is readily adjustable according to the crop and soil conditions. The suspension and floatation system is independent of the hydraulic lifting system so that no pumping action takes place. In other words, the gap between the wheel arms and the rearward extensions of the lower header supporting links, when the header is in an operative position, is such that the header can float independently of the hydraulic system when the latter is operating. The skids and cutter drums are maintained generally parallel to the ground when the header is lifted to the transport position.

The machine width when the machine is in transport position is almost equal to the actual cutting width due to the provision of the "over-the-header" drawbar. Thus the maximum cutting width for this type of machine is achieved and yet the total machine width is still within the acceptable limits. The machine is, nevertheless, compact due to the double lift system which reduces the clearance between the "over-the-header" drawbar and the header. This lower position of the drawbar also helps to provide a well-aligned power transmission line and to provide physical support therefor.

The replacement of the conventional reciprocating sickle type cutterbar or disc mower, together with the associated reel, by a drum type mower structure has helped to provide a compact machine. The header is raised and lowered generally parallel to the ground due to the master and slave hydraulic lifting system which is not affected by hydraulic back pressure. Finally, the "over-the-header" drawbar can be moved from the transport position to the operative position and vice versa without the use of any hydraulics.

Some aspects of the illustrated embodiment are described and claimed in co-pending Patent Specification No. 890,091.

What we claim is:
1. A harvesting machine comprising:

a rigid, generally rectangular frame having upper and lower transverse beams and substantially vertical legs interconnecting the respective ends of said upper and lower transverse beams;

a plurality of mounting shafts detachably rotatably journalled between said upper and lower transverse beams;

a cutter unit rotatably mounted on each said mounting shaft;

upper and lower bracket means detachably connected to said upper and lower transverse beams, respectively, for rotatably journalling each said mounting shaft;

a single belt power transfer means interconnecting each said cutter unit for transferring rotational power therebetween, said single belt power transfer means being entirely below said upper transverse beam;

power input means connected to said power transfer means for delivering rotational power thereto.

2. A harvesting machine of claim 1 wherein said single belt power transfer means includes a drive pulley connected to said power input means, a pulley affixed to each said cutter unit and a drive belt extending around said drive pulley and each said cutter unit pulleys, said drive pulley and said cutter unit pulleys being in the same plane beneath said upper transverse beam.

3. The harvesting machine of claim 2 wherein said cutter unit pulleys are integrally formed with said cutter units.

4. The harvesting machine of claims 1 or 2 wherein said generally rectangular frame is connected to and supported by a main frame superstructure, said main frame having a transverse member and two substantially vertical side members depending downwardly from the respective ends of said transverse member.

5. The harvesting machine of claim 4 wherein said rectangular frame is connected to said main frame by a suspension means, said suspension means including a resilient spring-like means for floatingly supporting said rectangular frame above the ground and upper and lower link means for pivotally interconnecting said main frame and said rectangular frame, said lower link means having a pivotal connection on the respective side members of said main frame.

6. The harvesting machine of claim 5 wherein said main frame further includes a wheel arm pivotally connected to each said side member, each said wheel arm having a ground wheel for carrying said harvesting machine, and a lifting means cooperating with said wheel arms and said lower link means for moving said rectangular frame and said main frame relative to the ground.

7. The harvesting machine of claim 6 wherein at least one of said side members of said main frame includes a latch means for latching said rectangular frame in a raised transport position, the corresponding wheel arm including a stop means for cooperating with said latch means to maintain said rectangular frame in said raised transport position.

8. The harvesting machine of claim 7 wherein an elongated rotary conditioning means for conditioning crops severed by said cutter units is positioned rearward of said cutter units such that the conditioning means will receive the crop after it is severed by said cutter units.

* * * * *